(12) United States Patent
Bennett et al.

(10) Patent No.: US 6,490,812 B1
(45) Date of Patent: Dec. 10, 2002

(54) ACTIVE MICROCHANNEL FLUID PROCESSING UNIT AND METHOD OF MAKING

(75) Inventors: Wendy D. Bennett, Kennewick, WA (US); Peter M. Martin, Kennewick, WA (US); Dean W. Matson, Kennewick, WA (US); Gary L. Roberts, West Richland, WA (US); Donald C. Stewart, Richland, WA (US); Annalee Y. Tonkovich, Pasco, WA (US); Jennifer L. Zilka, Pasco, WA (US); Stephen C. Schmitt, Dublin, OH (US); Timothy M. Werner, Columbus, OH (US)

(73) Assignee: Battelle Memorial Institute, Richland, WA (US)

( * ) Notice: Subject to any disclaimer, the term of this patent is extended or adjusted under 35 U.S.C. 154(b) by 53 days.

(21) Appl. No.: 09/735,062

(22) Filed: Dec. 11, 2000

Related U.S. Application Data

(62) Division of application No. 09/265,227, filed on Mar. 8, 1999, now Pat. No. 6,192,596.

(51) Int. Cl.$^7$ .................................................. F26B 7/00
(52) U.S. Cl. ........................... 34/433; 34/417; 34/487; 34/508; 34/518; 422/129; 422/191; 165/165; 165/167
(58) Field of Search ................... 34/76, 77, 94, 34/103, 104, 107, 628, 634, 636, 380, 381, 417, 433, 442, 487, 508, 518; 165/165, 167, 168; 422/50, 129, 130, 179, 191; 62/498, 51.1, 115; 122/32, 483; 431/1; 429/17, 19, 20, 26; 29/157.3 D, 890.039

(56) References Cited

U.S. PATENT DOCUMENTS

| | | |
|---|---|---|
| 3,823,457 A | 7/1974 | Staas et al. ............... 29/157.3 |
| 3,856,270 A | 12/1974 | Henker .......................... 259/4 |
| 3,912,003 A | 10/1975 | Schrade ...................... 165/179 |
| 4,301,863 A | 11/1981 | Bizzarro ..................... 165/166 |
| 4,373,579 A | 2/1983 | Jernqvist et al. ............ 165/167 |
| 4,386,505 A | 6/1983 | Little ........................... 62/514 |
| 4,392,362 A | 7/1983 | Little ........................... 62/514 |
| 4,401,155 A | 8/1983 | Royal et al. ................ 165/166 |
| 5,016,707 A | 5/1991 | Nguyen ...................... 165/167 |
| 5,270,127 A | 12/1993 | Koga et al. ................... 429/17 |
| 5,275,235 A | 1/1994 | Cesaroni ..................... 165/170 |
| 5,455,401 A | 10/1995 | Dumais et al. ......... 219/121.52 |
| 5,534,328 A | 7/1996 | Ashmead et al. ............ 428/166 |
| 5,611,214 A | 3/1997 | Wegeng et al. ............... 62/498 |
| 5,620,616 A | 4/1997 | Anderson et al. ....... 219/121.52 |
| 5,658,537 A | 8/1997 | Dugan ......................... 422/191 |
| 5,690,763 A | 11/1997 | Ashmead et al. ............. 156/60 |
| 5,811,062 A | 9/1998 | Wegeng et al. ............. 422/129 |
| 5,836,383 A | 11/1998 | Zwittig ....................... 165/167 |

FOREIGN PATENT DOCUMENTS

| | | | |
|---|---|---|---|
| DE | 195 11 603 A1 | 10/1996 | |
| EP | 0 308 976 A1 | 3/1989 | ...................... 3/34 |
| EP | 0 484 278 A1 | 5/1992 | ...................... 35/8 |
| EP | 0 754 492 A2 | 1/1997 | .................... 19/24 |
| WO | WO 97/14497 | 4/1997 | |

*Primary Examiner*—Jiping Lu
(74) *Attorney, Agent, or Firm*—Stephen R. May; Frank S. Rosenberg

(57) ABSTRACT

The present invention is an active microchannel fluid processing unit and method of making, both relying on having (a) at least one inner thin sheet; (b) at least one outer thin sheet; (c) defining at least one first sub-assembly for performing at least one first unit operation by stacking a first of the at least one inner thin sheet in alternating contact with a first of the at least one outer thin sheet into a first stack and placing an end block on the at least one inner thin sheet, the at least one first sub-assembly having at least a first inlet and a first outlet; and (d) defining at least one second sub-assembly for performing at least one second unit operation either as a second flow path within the first stack or by stacking a second of the at least one inner thin sheet in alternating contact with second of the at least one outer thin sheet as a second stack, the at least one second sub-assembly having at least a second inlet and a second outlet.

42 Claims, 7 Drawing Sheets

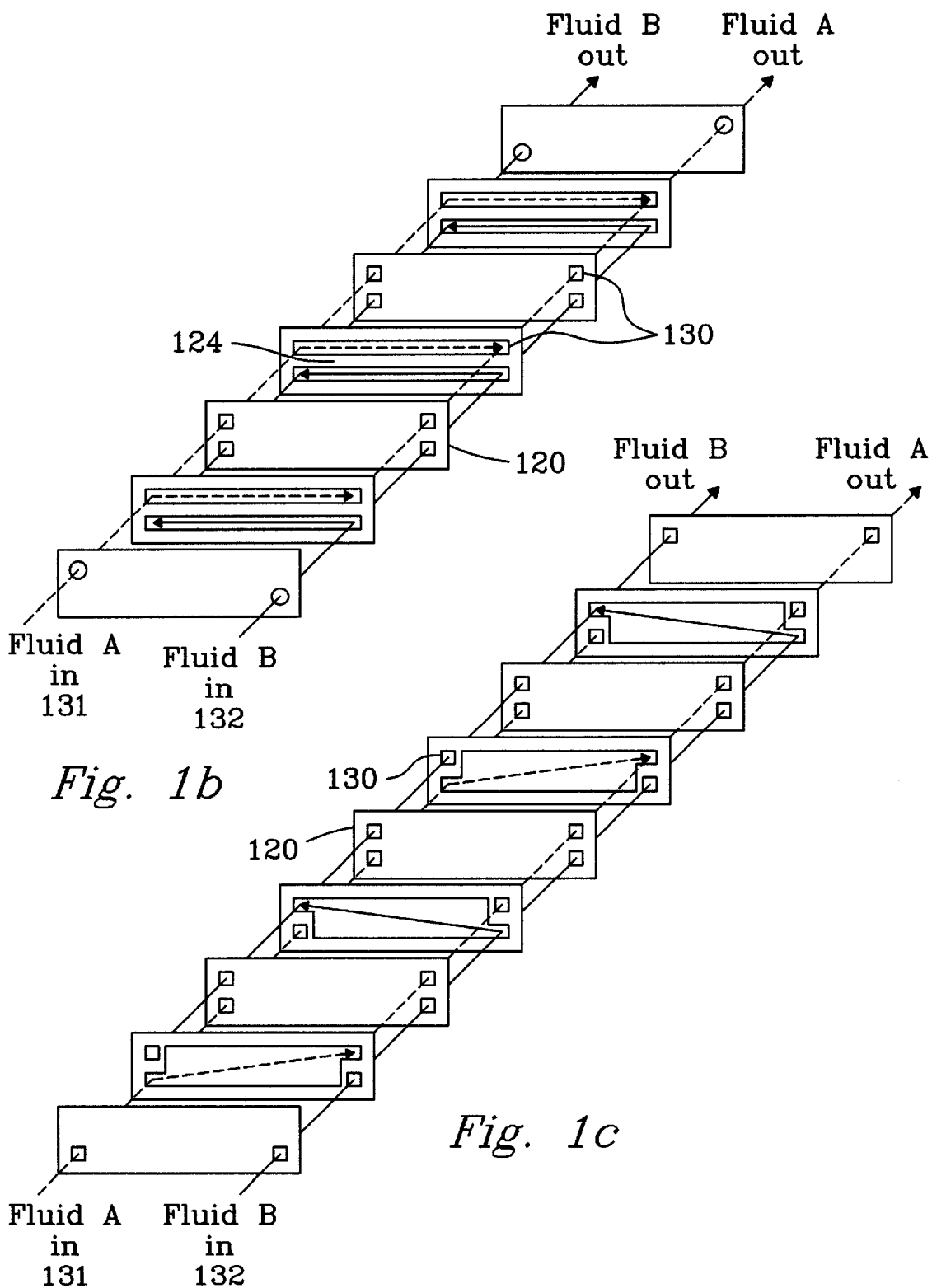

END VIEW comb gas out, 0.010 channels      divider shims 0.005"

vaporized liquid out, 0.005 channels

ACTIVE MICROCHANNEL FLUID PROCESSING UNIT AND METHOD OF MAKING

RELATED APPLICATIONS

This application is a divisional of U.S. patent application Ser. No. 09/265,227, filed Mar. 8, 1999, now U.S. Pat. No. 6,192,596.

This invention was made with Government support under Contract DE-AC0676RLO1830 awarded by the U.S. Department of Energy. The Government has certain rights in the invention.

FIELD OF THE INVENTION

The present invention is an active microchannel fluid processing unit and method of making.

BACKGROUND OF THE INVENTION

Miniaturized or small-scale fluid processing units, especially for multiple unit operations as chemical processing devices have been developed for military, automotive, and remote applications where size and weight limitations are important considerations. Typical applications include heating and/or cooling devices, fuel processors, and chemical synthesis units.

As shown in U.S. Pat. No. 5,611,214 entitled MICRO-COMPONENT SHEET ARCHITECTURE, miniaturization is accomplished with micromachining microchannels onto a laminate. Laminates are stacked to form systems. This approach has also been shown in U.S. Pat. Nos. 4,392,632, 4,386,505, for refrigerators. U.S. Pat. No. 5,690,763 and WO 97/14497 (PCT/US96/16546) show microchannels on laminae for chemical processes. A disadvantage of this "laminate" approach is the cost of the micromachining and the limited dimensions of the microchannels depending upon the type of micromachining process selected. More specifically, the dimension that is limited is the thinness of the fin between channels that may be achieved with machining. The machining forces necessarily require that the fin have sufficient thickness to withstand the machining process which may be thicker than a thermal optimal design.

An alternative form of "stacked" plates may be found in U.S. Pat. Nos. 5,455,401 and 5,620,616 for a plasma torch electrode. A stacked arrangement is also found in U.S. Pat. No. 5,016,707 for a multi-pass crossflow impingement heat exchanger.

Thus, the present state of the art offers the choices of multiple unit operations in a laminate structure that is expensive or single unit operation in a stacked structure that is less expensive. Accordingly, there is a need in the art for a method of making a fluid processing unit capable of multiple unit operations that is less expensive.

SUMMARY OF THE INVENTION

The present invention is an active microchannel fluid processing unit and method of making, both relying on having (a) at least one inner thin sheet; (b) at least one outer thin sheet; (c) defining at least one first sub-assembly for performing at least one first unit operation by stacking a first of the at least one inner thin sheet in alternating contact with a first of the at least one outer thin sheet into a first stack and placing an end block on the at least one inner thin sheet, the at least one first sub-assembly having at least a first inlet and a first outlet; and (d) defining at least one second sub-assembly for performing at least one second unit operation either as a second flow path within the first stack or by stacking a second of the at least one inner thin sheet in alternating contact with second of the at least one outer thin sheet as a second stack, the at least one second sub-assembly having at least a second inlet and a second outlet.

Each sub-assembly performs a unit operation. A unit operation is defined as an operation that changes the state of a working fluid including but not limited to condensation; evaporation; compression; pumping; heat exchanging; expansion; separation, for example solvent extraction, ion exchange, gas absorption, gas adsorption, distillation, phase separation, filtration; and chemical reaction, for example catalytic, non-catalytic, single phase (gas, liquid, plasma), and multiple phase. Two or more unit operations combined form a system operation. According to the present inventions, multiple unit operations as a minimum may be two (2) unit operations. Two unit operations may be achieved with a single fluid path or multiple fluid paths. For example, a single fluid may be pressurized then heated. Also, for example one fluid may undergo an exothermic chemical reaction followed by giving up heat to a second fluid. Although a heat exchanger has two fluids changing state and therefore may be considered two unit operations, a heat exchanger is defined herein as one unit operation, consistent with industry practice.

Systems include but are not limited to heat pumps, heat engines, thermochemical compressors, fuel cells, chemical synthesis units including pharmaceutical, and chemical purification units, analytical devices such as sensors, chromatographs and multiple catalyst screening tool. It will be understood that such systems may require only two or a few sub-assemblies performing at least two unit operations, or may require tens, hundreds or thousands of sub-assemblies performing at least two unit operations. It will be further understood that such systems may include components beyond the sub-assembly(ies) of the present invention, for example balance of plant.

An object of the present invention is to provide an active microchannel fluid processing unit capable of performing at least two unit operations. An advantage of the present invention is reduced cost of constructing a system or subsystem of two or more unit operations for fluid processing. Further advantages include elimination of gaskets or other sealing devices commonly used in high temperature/high pressure devices, and minimization of fluid interconnects because all liquids and gases involved in the process are confined within the as-built device. The stacking fabrication method of the present invention permits the formation and incorporation of complex microchannel arrays and headers within the completed device without the need for post-assembly machining.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1b is an expanded view of a stack of alternating sheets forming two flow paths separated vertically.

FIG. 1c is an expanded view of a stack of alternating sheets forming two flow paths separated horizontally.

FIG. 2b shows individual thin sheets used for the reactor of FIG. 2a.

FIG. 2c shows individual thin sheets used for the combustor of FIG. 2a.

FIG. 3b shows the individual thin sheets used for the integral assembly of FIG. 3a.

FIG. 4b is a thin sheet spacer to be assembled with the thin sheet of FIG. 4a.

DESCRIPTION OF THE PREFERRED EMBODIMENT(S)

Figure 1A:
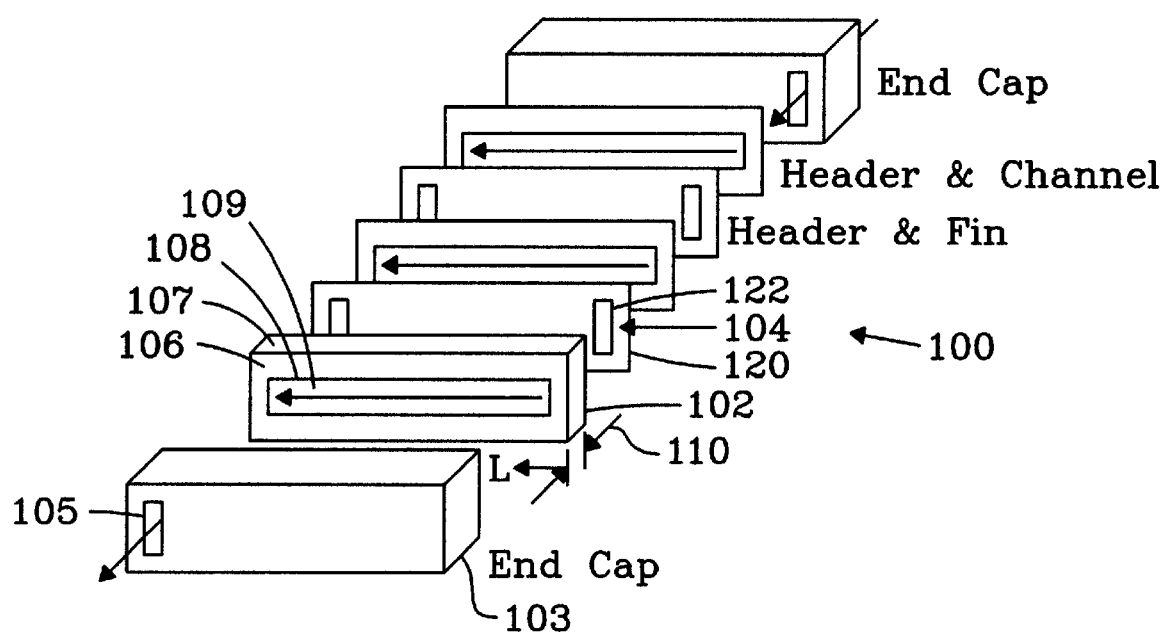
FIG. 1a is an expanded view of a stack of alternating thin sheets forming a flow path.

The present invention is an active microchannel fluid processing unit and method of making. Both rely upon the following features as shown in FIG. 1a. Referring to FIG. 1a at least one first sub-assembly 100 for performing at least one first unit operation is made by stacking a first of the at least one inner thin sheet 102 in alternating contact with a first of the at least one outer thin sheet 120 into a first stack and placing an end block 103 on the at least one inner thin sheet 102, the at least one first sub-assembly 100 having at least a first inlet 104 and a first outlet 105. The at least one inner thin sheet 102 has at least one solid margin 106 around at least one circumference 107, the at least one solid margin 106 defining at least one edge 108 of at least one slot 109 through a thickness 110. The at least one outer thin sheet 120 has at least one header hole 122 positioned within the solid margin 106. The at least one inner thin sheet 102 is placed adjacent the at least one outer thin sheet 120. The solid margin 106 sealably spaces the at least one outer thin sheet 120. And, the at least one outer thin sheet 120 defines at least one longitudinal wall of a flow channel having a length parallel to a thin sheet length L, wherein a fluid enters through the at least one header hole 122 into the at least one slot 109 to flow in a direction parallel or longitudinal to the length of the flow channel and exits through another header that may be located on the at least one outer thin sheet 120 having the at least one header hole 122, or on a second outer thin sheet placed on an opposite side of the inner thin sheet 102.

The margin 106 may be any geometric shape including but not limited to rectangular (as shown) circular, semicircular, regular polygon, irregular polygon, non-circular curved, and combinations thereof. Accordingly, the at least one edge 108 may be any geometric shape similar to or independent of the geometric shape of the margin 106. The at least one edge 108 may be symmetrically positioned with respect to the margin 106 as shown or non-symmetrically positioned. An example of a single edge shape is a circle. A rectangular shape with four edges (as shown) is often preferred.

Referring to FIGS. 1b, 1c additional holes 130 may be used to accommodate a second fluid. If used as a heat exchanger, the first sub-assembly 100 receives a hot fluid 131 that is directed through the upper series of channels. Heat is conducted vertically through the intervening material 124 of the outer thin sheets 120 and into a cooler fluid 132 flowing through the lower channels. Using this type of design, heat transfer need only occur across the thickness of the outer thin sheets or fin shims 120, reducing heat transfer resistance by minimizing the conduction pathway. Flows of hot and cold fluids 131, 132 in this type of microchannel device can be configured in either a co-flow or counter-flow mode, as required for a specific heat transfer application. In FIG. 1c, heat transfer is horizontal through the outer thin sheet 120 which can be more thermally efficient than the vertical heat transfer.

At least one second sub-assembly for performing at least one second unit operation is defined either within the first stack or by stacking a second of the at least one inner thin sheet 102 in alternating contact with a second of the at least one outer thin sheet 120 as a second stack, the at least one second sub-assembly having at least a second inlet and a second outlet.

As used herein, a microchannel has at least one dimension (typically the width) less than 1000 $\mu$m, often less than 250 $\mu$m. Depth of a microchannel ranges from about 50 $\mu$m to about 5000 $\mu$m. Length is unlimited, but as a practical matter for the overall purpose of miniaturization, the length is on the order of a centimeter to tens of centimeters. Arrays of parallel microchannels separated by thermally conductive fins provides an efficient mechanism for heat transfer either to or from fluids moving through the microchannels.

In other words, parallel arrays of microchannels may be formed by alternately stacking thin sheets or shims containing channel features with solid shims acting as fins separating the channels. The elongated channels in the inner thin sheets or channel shims 102 are machined or etched through the shim so that the slot or channel area 109 is typically open. The pattern for the outer thin sheets or fin shims 120 contains at least one header hole 122 aligned with either end of the channel ends of the channel shims 102. When the channel shims 102 and fin shims 120 are alternately stacked, a series of parallel channels are formed that are bounded on either side by solid fins. A header is formed at either end of the channels by the holes 122 in the fin shims 120 that are aligned with the ends of the open channels 109 in the channel shims 102. Widths of microchannels produced by this method are determined by the thickness of the shim material used to produce the channel shims. Shim thicknesses used for producing the types of devices discussed here typically range from about 25 $\mu$m to 250 $\mu$m. The microchannel heights and lengths are determined by the patterned area of the channel shims. Using this assembly method, microchannels having a wide range of aspect ratios (height/width) can be produced. Endblocks or endplates 103 having sufficient thickness to accommodate inlets and outlets or fluid connections 104, 105 may be added to either end of the stack(s) of patterned shims to complete the active microchannel fluid process unit. Alternatively, the stack may be drilled through a side to an internal header followed by attaching fluid connections 104,105.

Individual shims 102,120 may be made from any material compatible with the operating conditions of the system. Typically, elevated temperature and/or pressure require the use of a metal, for example copper or stainless steel. For metals, a preferred shim cutting method is photochemical etching.

Photochemical etching produces shims having acceptable tolerances in the thicknesses of material (50 $\mu$m to 500 $\mu$m)

for the flowpath dimensions commonly employed (0.1–1.0 cm). This patterning process has the capability to produce shims having highly complex patterns with no surface burring.

Other patterning processes such as laser machining, electrochemical machining or stamping may also prove viable for producing shims for specialized applications or in mass production.

The endblocks 103 used to sandwich the stacked shims and provide fluid interconnects are machined on a per-piece basis which may be automated for producing a stacked device in large quantities. Patterned shims 102,120 are cleaned, preferably vapor degreased, prior to assembly to remove residual photoresist from the patterning process and any other organic contaminants.

Bonding of stacked shim/endblock sub-assemblies into a single solid piece made of metal may be a high temperature/high pressure diffusion bonding process under a vacuum. Sub-assemblies are placed into a pre-oxidized high temperature alloy clamping device to provide alignment and side support. Bonding is accomplished in a vacuum hot press. An alloy endplate and ram extension are used to transmit pressure from the hot press ram to the stacked sub-assembly. For stainless steel, bonding conditions may be 920° C. and 4000 psi for 4 hr. Of course, one skilled in the art will recognize that diffusion bonding may be done under various conditions inasmuch as diffusion bonding is a time, pressure, and temperature variable process. An alternative diffusion bonding process avoids an external ram. The ram-less process relies upon a positive difference between thermal expansion coefficients of the sub-assembly material compared to the clamping device material to produce the pressure required for bonding at elevated temperature. Ultrasonic bonding processes may also be used.

Alternatively, metal bonding includes but is not limited to diffusion brazing, hot isostatic pressing and combinations thereof.

Alternative materials including but not limited to plastics, ceramics, glasses and combinations thereof may be used with corresponding bonding techniques. For example a ceramic of alumina alternately stacked with alumina silicate green tapes bonds upon firing. Plastics may be heat bonded or glued.

Because the bonded sub-assembly acts as a solid piece of material, additional machining may be performed on the laminated parts after bonding. Such machining may be desired or necessary to achieve smooth surfaces for o-ring or gasket seals, to provide additional fluid inlet or outlet ports, to reduce the overall mass of the resulting part, or for aesthetics.

Material compatible tubing may be attached to the fluid inlet and outlet ports 104,105 of the sub-assembly(ies) after bonding. For metals, brazing or welding are preferred methods of making sealed connections. This connection method takes up much less surface area on the finished part and requires less material depth than other connection methods such as machined fittings.

Figure 2A:
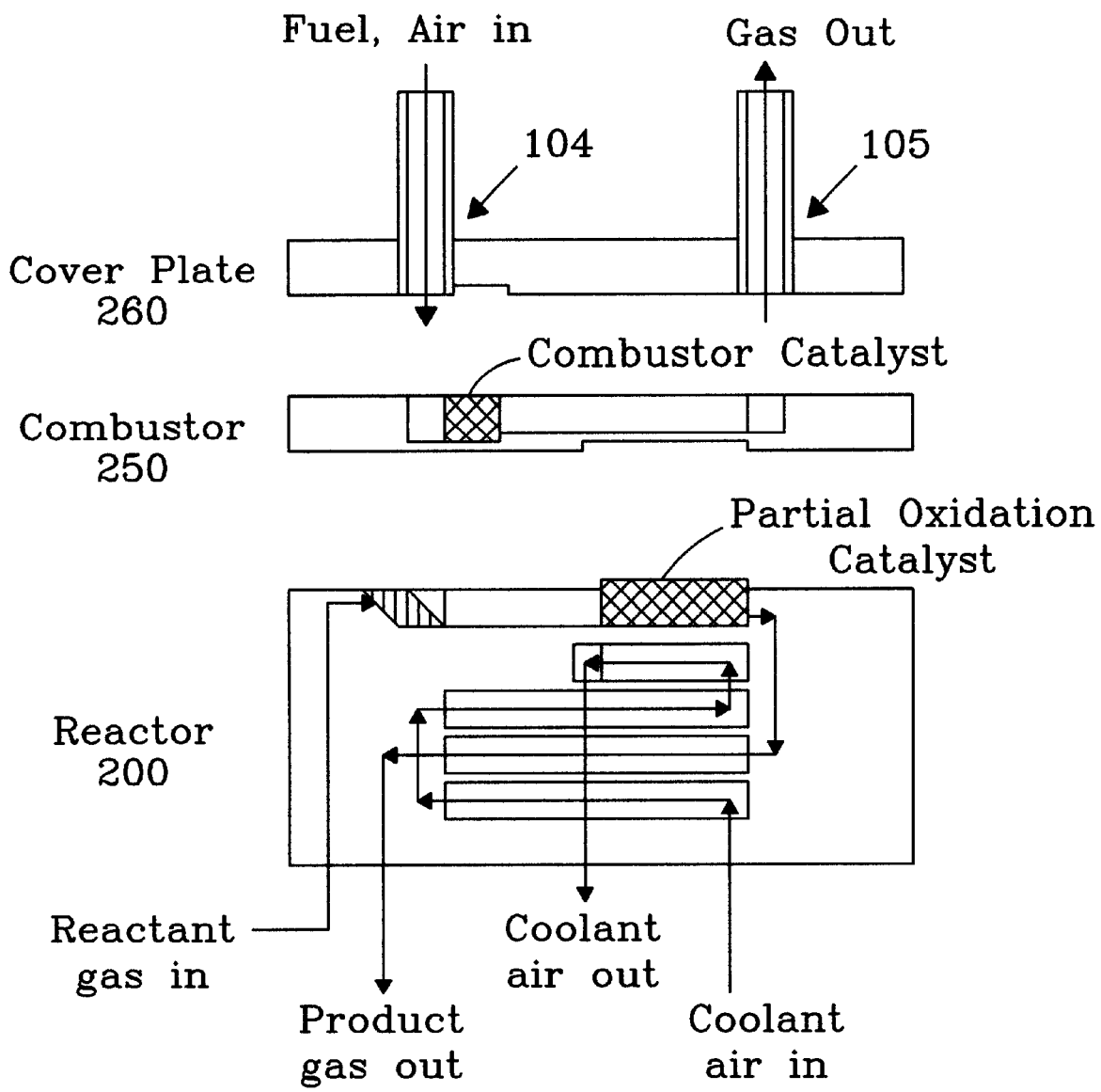
FIG. 2a is an expanded cross section of an assembly of two independently stacked sub-assemblies of a reactor and a combustor.

Another example of a first sub-assembly 100 is shown in FIG. 2a as a reactor 200. Another example of a second sub-assembly is shown in FIG. 2a as a combustor 250. The microcomponent reactor/combustor 200, 250 was designed to provide production of hydrogen for proton exchange membrane (PEM) fuel cells. The device was designed with a combustor section 250 to pre-heat reactant gases, and a catalytic reactor section 200 to process hydrocarbon feedstocks (methane, alcohols, gasoline, etc) into partial oxidation products. An all-metal design was stipulated to permit operation at temperatures approaching 1000° C. in the combustor 250. Although not necessary from a fabrication standpoint, the device was produced in three sections to permit loading and replacement of foam metal catalyst supports in the reactor 200. The reactor 200 and the combustor 250 were the two of the three parts comprising the device that were fabricated using the stacked sub-assembly diffusion bonding method to incorporate microchannels for enhanced heat transfer. The third component 260 was a solid stainless steel plate required to seal the top of the device.

Figure 2B:
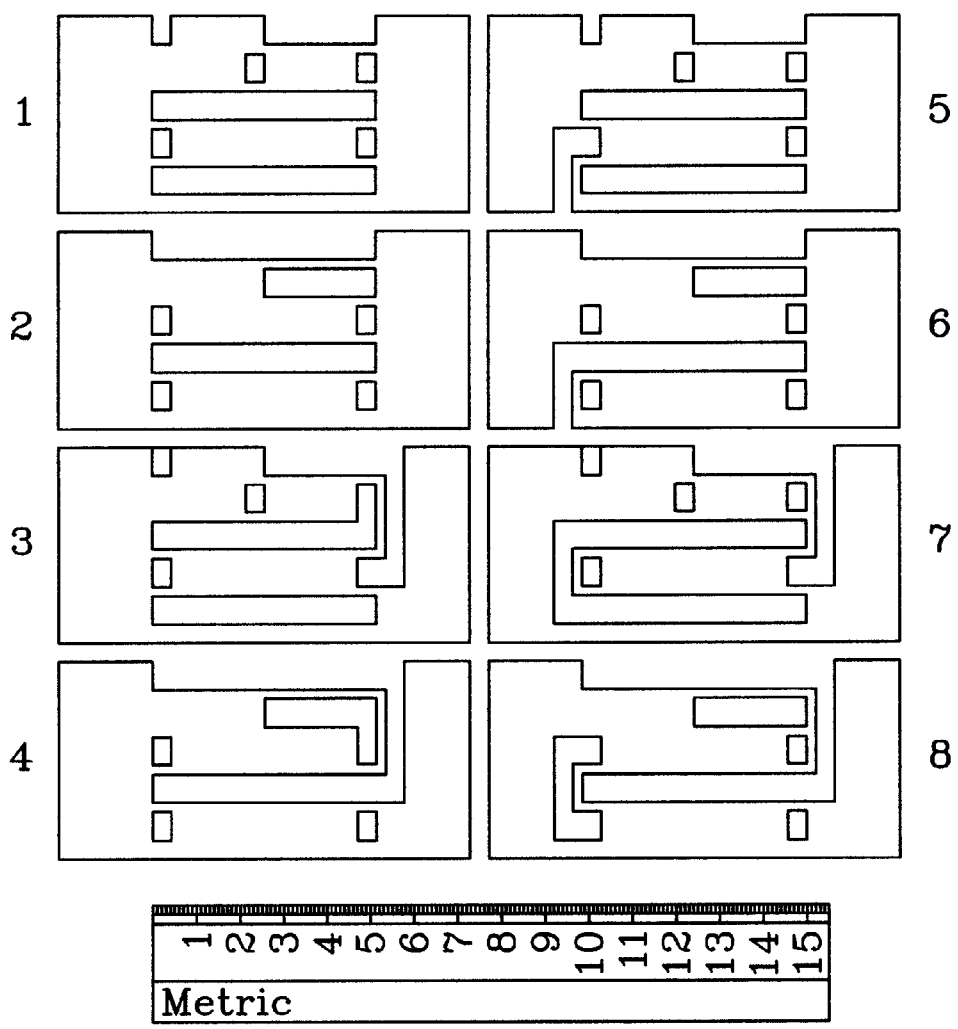
Figure 2C:
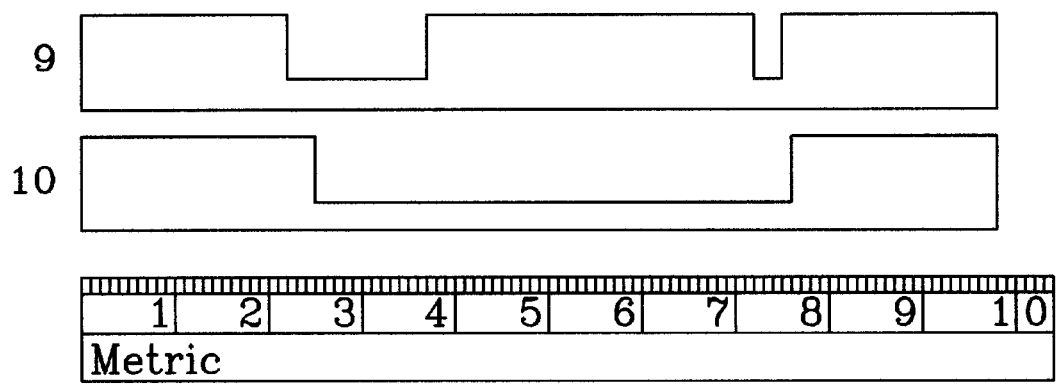
Figure 3A:
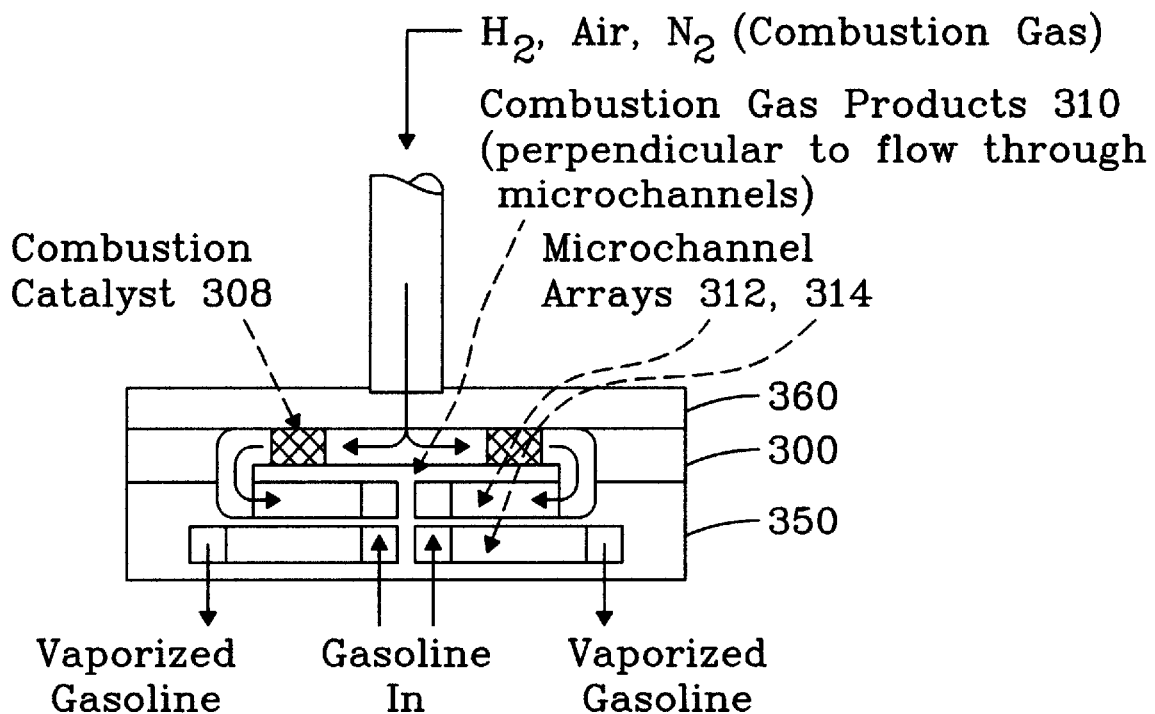
FIG. 3a is a cross section of a combustor and vaporizer integral assembly.

Patterned shims used to produce the laminated combustor/reactor are shown in FIGS. 2b, 2c. All shims were photochemically etched in 250 μm-thick type 316 stainless steel. Eight different shim patterns (FIG. 3a) were required to produce the reactor 200 in order to accommodate the various coolant, fuel, and gas product flow paths required in this section of the device.

The assembly order for the reactor 200 was:
1. solid end block 103 (FIG. 1a)
2. 12 each shim #3 (FIG. 2b) and 13 each shim #4 (FIG. 2b), alternating
3. 26 each, shims #1 and #2 (FIG. 2b), alternating
4. 8 each, shims #5 and #6 (FIG. 2b), alternating
5. 26 each, shims #1 and #2 (FIG. 2b), alternating
6. 12 each shim #7 (FIG. 2b) and 13 each shim #8 (FIG. 2b), alternating
7. endblock 103 with coolant outlet 105 (FIG. 1a)

The combustor 250 consisted of only two shim designs (FIG. 2c) and had no internal flow channels when assembled. The assembly order for the combustor 250 was:
1. solid end block 103 (FIG. 1a)
2. 85 each shims #9 and #10 (FIG. 2c), alternating
3. solid end block 103 After diffusion bonding at the conditions specified above, the components were machined to add grooves for "C"-cross section metal seal rings between the components and a series of bolt holes around the perimeter of the device. Excess metal was also machined from the corners to reduce the weight and thermal mass of the finished device. Stainless steel tubing was welded onto the device at all inlet 104 and outlet 105 ports to facilitate fluid connections.

In operation, the reactor 200 performs two unit operations of heat transfer (receiving heat) and partial oxidation reaction. The combustor 250 performs the two unit operations of heat transfer (giving heat) and combustion.

An example of first and second sub-assemblies integral to a stack is also included in the present invention. An example of a device with integral first and second sub-assemblies fabricated using the stacked assembly diffusion bonding process was the microchannel gasoline vaporizer FIG. 3a, the first stage within a fuel processor to be used for automotive applications. As with the combustor/reactor described above, the gasoline vaporizer was designed with a combustor 300 using an auxiliary fuel to provide the heat required to drive the primary function of the device. Microchannel heat exchangers 350 were used to effectively transfer combustion heat to its area of use.

Figure 3B:
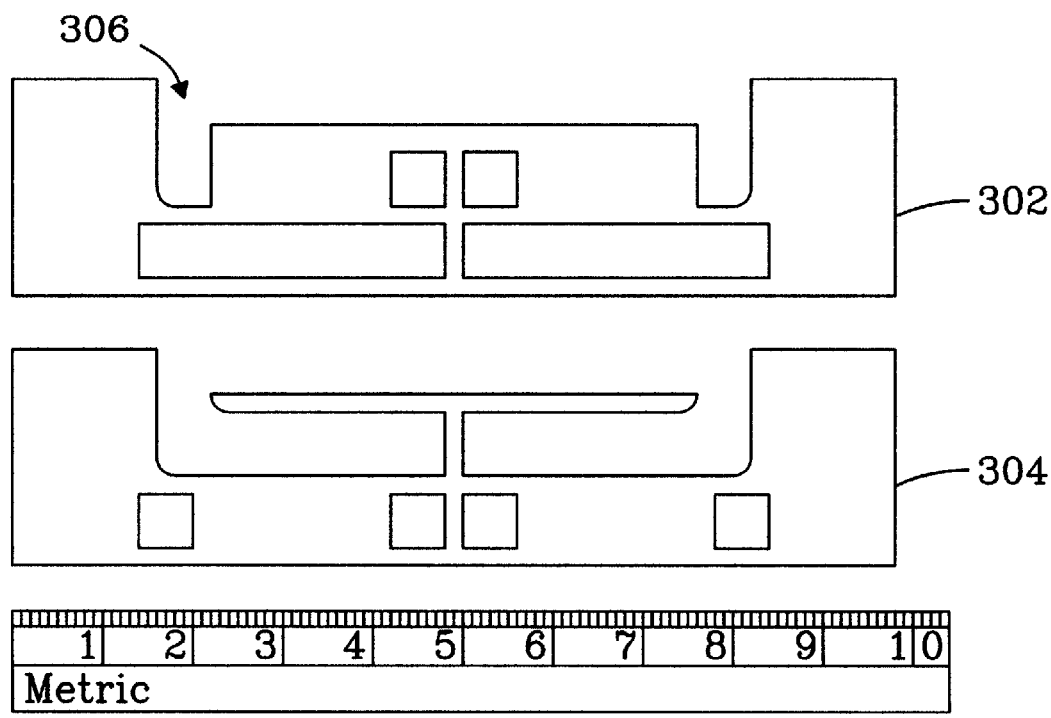

The gasoline vaporizer was produced using only two shim designs 302, 304 (FIG. 3b) and two solid end plates 103 (FIG. 1a). The shims were designed such that, when alternately stacked, two parallel series of microchannels were formed, separated by 1.7 mm of solid metal. Similarly, all fluid headers were produced by the design of the stacked shims. A total of 268 shims were used to produce the device.

When bonded, the device formed open cavities 306 designed to hold metal foam-supported combustion catalyst 308. After bonding, excess metal was removed to achieve a final shape. A groove (not shown) was machined to accommodate a metal "C"-section seal ring, bolt holes (not shown) were added around the perimeter, and ports were added for the liquid gasoline inlet, vaporized gasoline outlet, and the reaction gas exhaust. A solid top plate 360 containing the inlet port for combustion gas was also fabricated.

In operation, hot product gas 310 from the combustor 300 was directed into a series of microchannels 312 on the level below the combustion zone before being removed through exhaust ports (not shown) through the solid top plate 360. Heat was transmitted through fins of the microchannels and into the gasoline being pumped through the series of vaporizer channels 314.

EXAMPLE 1

The microchannel gasoline vaporizer was demonstrated at full-scale for an automotive application, vaporizing 265 cc/min of gasoline.

Alternative Embodiment

Figure 4A:
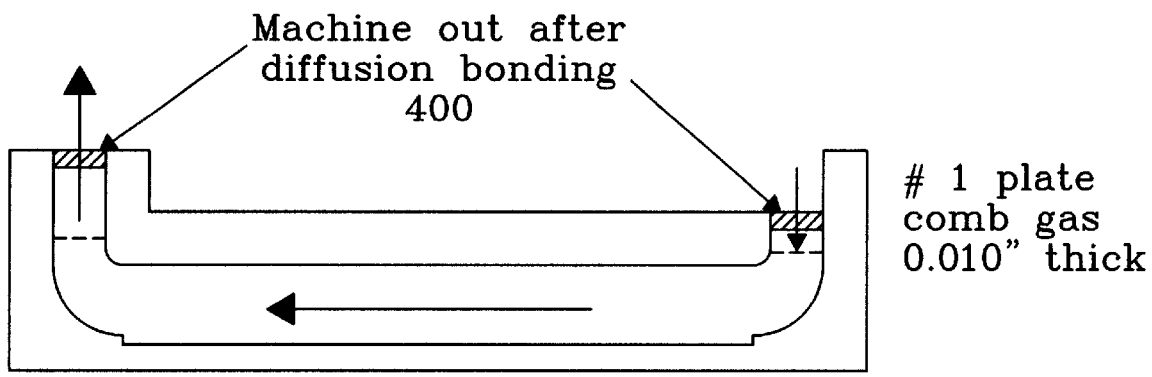
FIG. 4a is a thin sheet with post bonding knockouts.
Figure 4B:
Figure 4C:
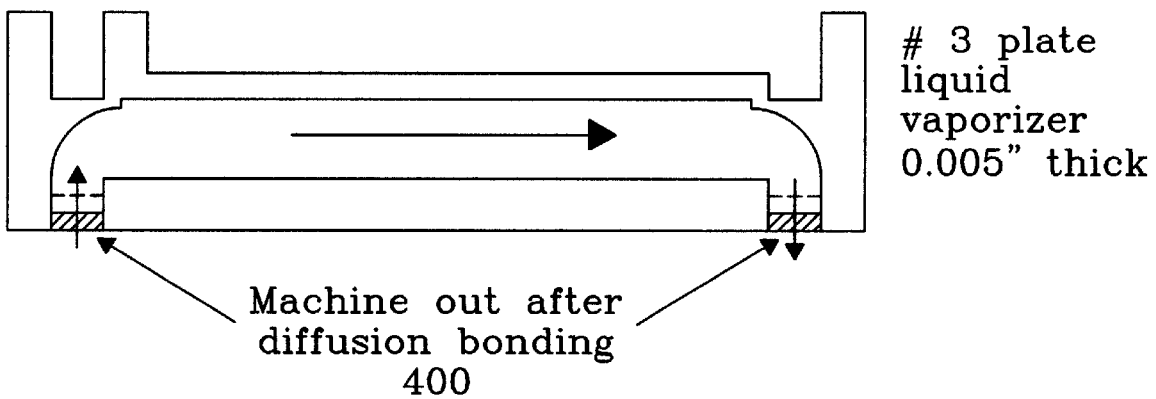
FIG. 4c is another thin sheet with post bonding knockouts to be assembled with the thin sheets of FIG. 4a and FIG. 4b.
Figure 4D:
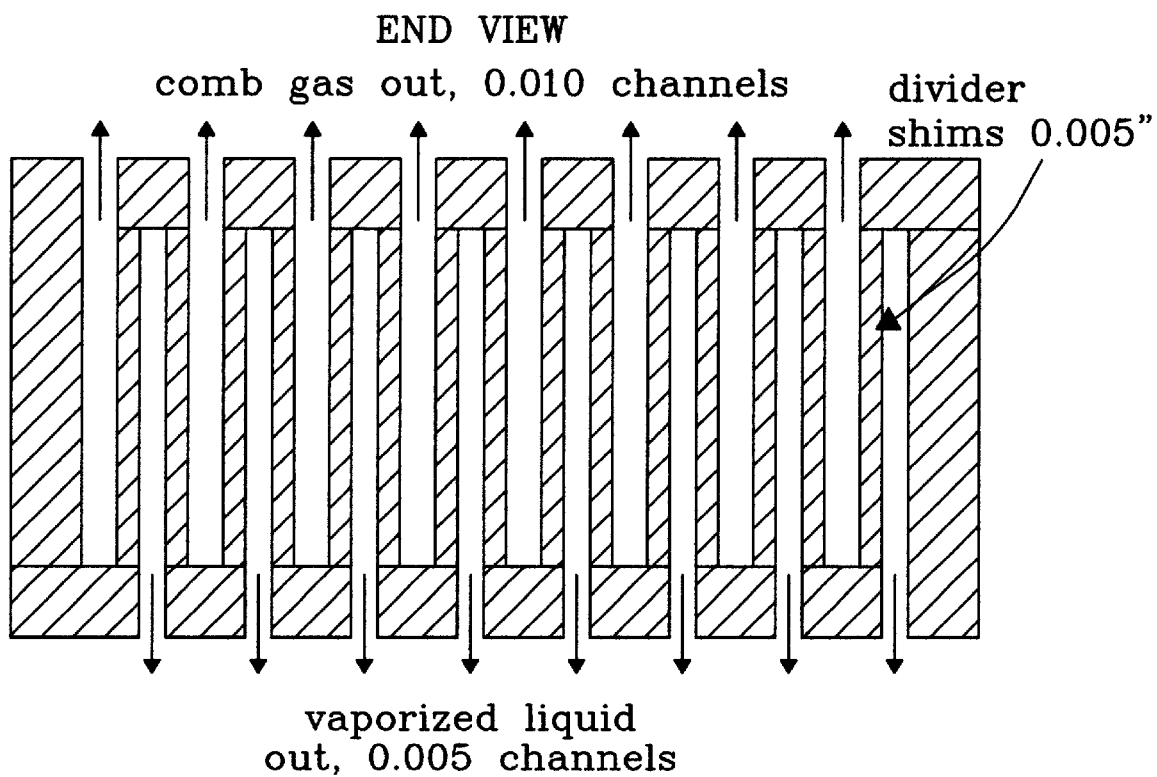
FIG. 4d shows the alternating flow channels obtained by assembling the thin sheets of FIGS. 4a, 4b, and 4c.
Figure 4E:
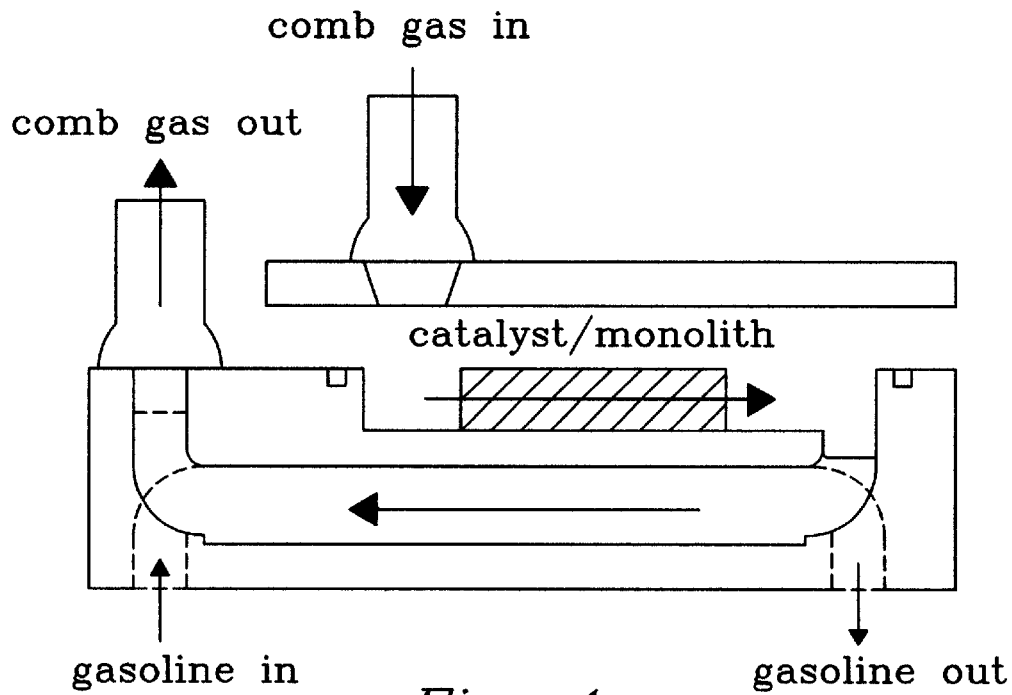
FIG. 4e is a cross section of the assembly of the thin sheets of FIGS. 4a, 4b and 4c with added inlet and outlet and catalyst.

An alternative heat exchanger design for achieving side by side counterflow is shown in FIGS. 4a, 4b, 4c, 4d, 4e. In this design, a portion of the shim is kept as a post bonding knockout 400. Side by side counterflow is achieved as shown in FIG. 4d. Assembly as a fuel vaporizer is shown in FIG. 4e.

Closure

While a preferred embodiment of the present invention has been shown and described, it will be apparent to those skilled in the art that many changes and modifications may be made without departing from the invention in its broader aspects. For example, slots need not be symmetric, and multiple slots may be oriented parallel or non-parallel to each other in any plane. The appended claims are therefore intended to cover all such changes and modifications as fall within the true spirit and scope of the invention.

We claim:

1. A method of making an active microchannel fluid processing unit, comprising bonding together at least one first sub-assembly and at least one second sub-assembly:

wherein the at least one first sub-assembly has at least a first inlet and a first outlet;

wherein the at least one first sub-assembly comprises at least one first inner sheet stacked in alternating contact with at least one first outer sheet, said at least first one inner sheet having a first major surface in contact with said at least one first outer sheet and a second major surface in contact with an outer sheet or an end block wherein said first major surface and said second major surface are separated by a thickness, and said at least first one inner sheet having at least one solid margin, said at least one solid margin defining at least one edge of at least one slot through said thickness;

wherein at least one inner sheet is stacked adjacent at least one outer sheet, wherein said at least one outer sheet has at least one opening positioned within said solid margin, wherein said solid margin sealably spaces said at least one outer sheet, wherein said at least one outer sheet defines at least one longitudinal wall of a flow channel having a length parallel to a sheet length, wherein said first assembly comprises a first flow path, such that, during operation of the bonded unit, a fluid can enter through said at least one opening into at least one slot to flow in a direction parallel to the length of said flow channel and exit through another opening that is located on either said at least one outer sheet having said at least one opening or on a second outer thin sheet disposed on an opposite side of said inner sheet;

wherein said at least one outer sheet and said at least one inner sheet form a first stack; and wherein said at least one second sub-assembly comprises at least a second inlet, a second outlet and a second flow path;

wherein said second flow path is separate from said first flow path;

wherein said second flow path is within said first stack or is in a second stack;

wherein said second stack, if present, comprises at least one second inner sheet placed in alternating contact with a second at least one outer sheet;

wherein, in the bonded unit, said at least one first sub-assembly is capable of performing at least a first unit operation and said at least one second sub-assembly is capable of performing at least a second unit operation.

2. The method of claim 1 wherein the first and the second unit operations are not both heat exchanges, and wherein said flow channel comprises a microchannel.

3. The method of claim 2 wherein said first sub-assembly comprises a heat exchanger and said second sub-assembly is capable of performing a unit operation selected from the group consisting of compression, pumping, separation, and chemical reaction.

4. The method of claim 2 wherein said second sub-assembly comprises a heat exchanger and said first sub-assembly is capable of performing a unit operation selected from the group consisting of compression, pumping, separation, and chemical reaction.

5. The method of claim 2 wherein said active microchannel fluid processing unit is made without any gaskets.

6. The method of claim 2 wherein said second flow path is within said first stack and wherein said first flow path and said second flow path are separated vertically.

7. The method of claim 2 wherein said second flow path is in a second stack.

8. The method of claim 2 wherein said flow channel has at least one dimension of less than 250 $\mu$m.

9. The method of claim 2 wherein said sheets are made of metal.

10. The method of claim 2 wherein said at least one first inner sheet has a thickness of 25 $\mu$m to 250 $\mu$m, and said at least one first outer sheet has a thickness of 25 $\mu$m to 250 $\mu$m.

11. The method of claim 10 wherein said at least one first inner sheet and said at least one first outer sheet are made of metal.

12. The method of claim 11 wherein said sheets are diffusion bonded.

13. The method of claim 12 wherein said second flow path is in a second stack and wherein said second stack comprises a third flow path such that a coolant gas can flow through said second stack.

14. The method of claim 2 wherein said sheets are made by patterning processes comprising laser machining, photochemical etching, or stamping.

15. The method of claim 14 wherein said sheets are made of metal and said at least one first inner sheet and said at least one first outer sheet are patterned by a process comprising photochemical etching.

16. The method of claim 14 wherein said patterned sheets are vapor degreased prior to assembly.

17. The method of claim 2 wherein said sheets are made of plastic and wherein said sheets are heat bonded or glued.

18. The method of claim 2 wherein said second flow path is within said first stack and wherein said flow channel and said second flow path comprise microchannels.

19. The method of claim 18 wherein said at least one inner sheet defines at least one longitudinal wall of a second flow channel, in said second sub-assembly, having a length parallel to a sheet length;
wherein said second sub-assembly comprises a second flow path, such that, during operation, a fluid can enter through an opening in said at least one outer sheet into said second flow channel and flow in a direction parallel to the length of said second flow channel.

20. A method of making an active microchannel fluid processing unit, comprising bonding together at least one first sub-assembly and at least one second sub-assembly:
wherein said at least one first sub-assembly has at least a first inlet and a first outlet;
wherein the at least one first sub-assembly comprises at least one first inner sheet stacked in alternating contact with at least one first outer sheet, said at least one inner sheet having at least one solid margin, said at least one solid margin defining at least one edge of at least one slot through a thickness;
wherein at least one inner sheet is stacked adjacent at least one outer sheet,
wherein said at least one outer sheet has at least one opening positioned within said solid margin,
wherein said solid margin sealably spaces said at least one outer sheet,
wherein said at least one outer sheet defines at least one longitudinal wall of a flow channel having a length parallel to a sheet length,
wherein said first sub-assembly comprises a first flow path, such that, during operation of the bonded unit, a fluid can enter through said at least one opening into at least one slot to flow in a direction parallel to the length of said flow channel and exit through another opening that is located on either said at least one outer sheet having said at least one opening or on a second outer thin sheet disposed on an opposite side of said inner sheet;
wherein said first sub-assembly comprises a heat exchanger wherein, during operation, heat transfer occurs in the direction in which the sheets are stacked; and
wherein said at least one outer sheet and said at least one inner sheet form a first stack; and
wherein said at least one second sub-assembly comprises at least a second inlet, a second outlet and a second flow path;
wherein said second flow path is separate from said first flow path;
wherein said second flow path is within said first stack or is in a second stack;
wherein said second stack, if present, comprises at least one second inner sheet in alternating contact with a second at least one outer sheet;
wherein, in said bonded unit, said at least one first sub-assembly is capable of performing at least a first unit operation and said at least one second sub-assembly is capable of performing at least a second unit operation.

21. The method of claim 20 wherein said flow channel comprises a microchannel.

22. The method of claim 21 wherein the first and the second unit operations are not both heat exchanges.

23. The method of claim 22 wherein said slot is through the entire thickness of said at least one inner sheet.

24. The method of claim 23 wherein said second flow path is in a second stack.

25. The method of claim 24 wherein said flow channel has at least one dimension of less than 250 µm.

26. The method of claim 24 wherein said at least one first inner sheet has a thickness of 25 µm to 250 µm, and said at least one first outer sheet has a thickness of 25 µm to 250 µm.

27. The method of claim 24 wherein said sheets are made of metal.

28. The method of claim 27 wherein said sheets are bonded by a method selected from the group consisting of ultrasonic bonding, diffusion brazing, hot isostatic pressing, and combinations thereof.

29. The method of claim 27 wherein said second stack comprises a third flow path such that a coolant gas can flow through said second stack.

30. The method of claim 24 wherein said sheets are made of plastic and the plastic sheets are heat bonded or glued.

31. The method of claim 30 wherein said second flow path comprises microchannels.

32. The method of claim 31 wherein said at least one inner sheet defines at least one longitudinal wall of a second flow channel, in said second sub-assembly, having a length parallel to a sheet length;
wherein said second sub-assembly comprises a second flow path, such that, during operation of the bonded unit, a fluid can enter through an opening in said at least one outer sheet into said second flow channel and flow in a direction parallel to the length of said second flow channel.

33. The method of claim 23 wherein, after said unit is bonded, said second sub-assembly is capable of performing a unit operation selected from the group consisting of compression, pumping, separation, and chemical reaction.

34. A method of performing multiple unit operations, comprising the steps of:
passing a first fluid into an inlet of at least one first sub-assembly;
wherein the at least one first sub-assembly comprises at least one first inner sheet in alternating contact with at least one first outer sheet, said at least first one inner sheet having a first major surface in contact with said at least one first outer sheet and a second major surface in contact with an outer sheet or an end block wherein said first major surface and said second major surface are separated by a thickness, and said at least first one inner sheet having at least one solid margin, said at least one solid margin defining at least one edge of at least one slot through said thickness;
wherein at least one inner sheet is adjacent at least one outer sheet,
wherein said at least one outer sheet has at least one opening positioned within said solid margin,
wherein said solid margin sealably spaces said at least one outer sheet,
wherein said at least one outer sheet defines at least one longitudinal wall of a flow channel having a length parallel to a sheet length,
wherein said first sub-assembly comprises a first flow path, such that, the first fluid enters through said at least one opening into at least one slot to flow in a direction parallel to the length of said flow channel and exits through another opening that is located on either said at least one outer sheet having said at least one opening or on a second outer thin sheet disposed on an opposite side of said inner sheet;

wherein said at least one outer sheet and said at least one inner sheet form a first stack; and wherein said first fluid changes state within said first flow path; and passing a second fluid into a second inlet of at least one second sub-assembly said at least one second sub-assembly comprising at least a second inlet, a second outlet and a second flow path;

wherein said second flow path is separate from said first flow path;

wherein said second flow path is within said first stack or is in a second stack;

wherein said second stack, if present, comprises at least one second inner sheet in alternating contact with a second at least one outer sheet;

wherein at least a first unit operation is performed in said at least one first sub-assembly and at least a second unit operation is performed in said at least one second sub-assembly.

35. A method of making a product comprising the method of claim 34.

36. A method of making a fluid by changing the state of at least one fluid comprising the step of passing said at least one fluid into at least one first inlet of at least one sub-assembly of an active microchannel fluid processing unit, said active microchannel fluid processing unit comprising:

(a) at least one first sub-assembly;

wherein said at least one first sub-assembly has at least a first inlet and a first outlet;

wherein the at least one first sub-assembly comprises at least one first inner sheet in alternating contact with at least one first outer sheet, said at least first one inner sheet having a first major surface in contact with said at least one first outer sheet and a second major surface in contact with an outer sheet or an end block wherein said first major surface and said second major surface are separated by a thickness, and said at least first one inner sheet having at least one solid margin, said at least one solid margin defining at least one edge of at least one slot through said thickness;

wherein said at least one inner sheet is adjacent said at least one outer sheet, wherein said at least one outer sheet has at least one opening positioned within said solid margin, wherein said solid margin sealably spaces said at least one outer sheet, wherein said at least one outer sheet defines at least one longitudinal wall of a flow channel having a length parallel to a sheet length, wherein said first assembly comprises a first flow path, such that, during operation, a fluid can enter through said at least one opening into at least one slot to flow in a direction parallel to the length of said flow channel and exit through another opening that is located on either said at least one outer sheet having said at least one opening or on a second outer thin sheet disposed on an opposite side of said inner sheet;

wherein said at least one outer sheet and said at least one inner sheet form a first stack; and (b) at least one second sub-assembly;

said at least one second sub-assembly comprising at least a second inlet, a second outlet and a second flow path;

wherein said second flow path is separate from said first flow path;

wherein said second flow path is within said first stack or is in a second stack;

wherein said second stack, if present, comprises at least one second inner sheet in alternating contact with a second at least one outer sheet;

wherein said fluid changes state in a first unit operation that is performed in said at least one first sub-assembly; and at least a second unit operation is performed in said at least one second sub-assembly.

37. A method of making a fluid comprising the method of claim 36 wherein said first unit operation comprises a chemical reaction.

38. The method of claim 37 wherein the flow channel comprises a microchannel.

39. The method of claim 38 wherein the flow channel has at least one dimension of less than 250 $\mu$m.

40. The method of claim 39 wherein the second flow path is in a second stack.

41. The method of claim 38 wherein said second flow path is within said first stack and wherein said flow channel and said second flow path comprise microchannels.

42. The method of claim 38 wherein said at least one inner sheet defines at least one longitudinal wall of a second flow channel, in said second sub-assembly, having a length parallel to a sheet length;

wherein said second sub-assembly comprises a second flow path, such that, during operation, a fluid can enter through an opening in said at least one outer sheet into said second flow channel and flow in a direction parallel to the length of said second flow channel.

* * * * *